United States Patent
Gellens

(10) Patent No.: US 8,671,144 B2
(45) Date of Patent: Mar. 11, 2014

(54) COMMUNICATING INFORMATION ABOUT THE CHARACTER OF ELECTRONIC MESSAGES TO A CLIENT

(75) Inventor: Randall Coleman Gellens, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2638 days.

(21) Appl. No.: 10/884,088

(22) Filed: Jul. 2, 2004

(65) Prior Publication Data

US 2006/0047768 A1 Mar. 2, 2006

(51) Int. Cl.
*G06F 15/16* (2006.01)

(52) U.S. Cl.
USPC ............ 709/206; 709/203; 709/217; 709/223

(58) Field of Classification Search
USPC .......... 709/206–207, 203, 217, 219, 223, 224
See application file for complete search history.

(56) References Cited

U.S. PATENT DOCUMENTS

| | | | | |
|---|---|---|---|---|
| 6,134,582 A * | 10/2000 | Kennedy | ...................... | 709/206 |
| 6,321,267 B1 | 11/2001 | Donaldson | ................... | 709/229 |
| 6,330,590 B1 | 12/2001 | Cotten | .......................... | 709/206 |
| 6,393,465 B2 | 5/2002 | Leeds | ........................... | 709/207 |
| 6,400,810 B1 | 6/2002 | Skladman et al. | ......... | 379/93.24 |
| 6,618,747 B1 * | 9/2003 | Flynn et al. | .................... | 709/206 |
| 6,622,909 B1 | 9/2003 | Thomas et al. | ................ | 235/375 |
| 6,650,890 B1 | 11/2003 | Irlam et al. | ................. | 455/412.1 |
| 6,654,787 B1 | 11/2003 | Aronson et al. | .............. | 709/206 |
| 6,691,156 B1 | 2/2004 | Drummond et al. | .......... | 709/206 |
| 6,757,830 B1 | 6/2004 | Tarbotton et al. | ............. | 713/188 |
| 6,769,016 B2 | 7/2004 | Rothwell et al. | .............. | 709/206 |
| 6,772,196 B1 | 8/2004 | Kirsch | .......................... | 709/206 |
| 6,779,021 B1 | 8/2004 | Bates et al. | ................... | 709/206 |
| 6,868,418 B1 * | 3/2005 | Avner et al. | ........................... | 1/1 |
| 2002/0198950 A1 | 12/2002 | Leeds | ........................... | 709/206 |
| 2003/0046421 A1 | 3/2003 | Horvitz et al. | ................ | 709/238 |
| 2003/0088627 A1 | 5/2003 | Rothwell et al. | .............. | 709/206 |
| 2003/0158905 A1 | 8/2003 | Petry et al. | ..................... | 709/206 |
| 2003/0195937 A1 | 10/2003 | Kircher, Jr. et al. | ........... | 709/207 |
| 2003/0225841 A1 | 12/2003 | Song et al. | .................... | 709/206 |
| 2004/0001090 A1 | 1/2004 | Brown et al. | ................. | 345/752 |
| 2004/0015554 A1 | 1/2004 | Wilson | .......................... | 709/206 |

(Continued)

FOREIGN PATENT DOCUMENTS

EP 1482696 A1 12/2004
WO WO 03/071753 8/2003

OTHER PUBLICATIONS

International Search Report and Written Opinion—PCT/US2005/023332—ISA/EPO—Sep. 30, 2005.

*Primary Examiner* — Lashonda Jacobs
(74) *Attorney, Agent, or Firm* — Fariba Yadegar-Bandari; James T. Hagler; Robert J. O'Connell

(57) ABSTRACT

A messaging system on a server computes a spamicity value (spam score) for incoming messages. The messaging system may filter the incoming messages using that spamicity value, or using any other basis. Conversely, the messaging system may not filter the messages at all. In either case, the spamicity value is communicated to a remote device prior to communicating the messages to the remote device. In this way, a messaging client at the remote device may determine whether to retrieve the messages using the calculated spamicity values from the server.

34 Claims, 4 Drawing Sheets

(56) References Cited

U.S. PATENT DOCUMENTS

| | | | |
|---|---|---|---|
| 2004/0034794 A1 | 2/2004 | Mayer et al. | 713/200 |
| 2004/0054741 A1 | 3/2004 | Weatherby et al. | 709/206 |
| 2004/0054887 A1 | 3/2004 | Paulsen, Jr. et al. | 713/154 |
| 2004/0068543 A1 | 4/2004 | Seifert | 709/206 |
| 2004/0078422 A1 | 4/2004 | Toomey | 709/202 |
| 2004/0093384 A1 | 5/2004 | Shipp | 709/206 |
| 2004/0117648 A1 | 6/2004 | Kissel | 713/200 |
| 2004/0158540 A1 | 8/2004 | Zuo | 705/408 |
| 2004/0176072 A1 | 9/2004 | Gellens | |
| 2004/0210640 A1 | 10/2004 | Chadwick et al. | 709/207 |
| 2004/0221016 A1 | 11/2004 | Hatch et al. | 709/207 |
| 2004/0249893 A1 | 12/2004 | Leeds | 709/206 |
| 2004/0249895 A1 | 12/2004 | Way | 709/206 |
| 2004/0260776 A1 | 12/2004 | Starbuck et al. | 709/206 |
| 2004/0260778 A1 | 12/2004 | Banister et al. | 709/206 |
| 2005/0204005 A1* | 9/2005 | Purcell et al. | 709/206 |
| 2005/0204006 A1* | 9/2005 | Purcell et al. | 709/206 |
| 2005/0223085 A1* | 10/2005 | Giles et al. | 709/220 |
| 2006/0031318 A1 | 2/2006 | Gellens | |

* cited by examiner

COMMUNICATING INFORMATION ABOUT THE CHARACTER OF ELECTRONIC MESSAGES TO A CLIENT

BACKGROUND OF THE INVENTION

The invention relates generally to the field of telecommunications, and more particularly to systems and methods for improving the filtering of electronic messages.

Electronic messaging has become commonplace. It is widely available to users in the workplace, at home, and even on remote devices like cellular phones and personal digital assistants. E-messaging takes very many forms, such as e-mail, instant messaging, Multimedia Messaging System (MMS) messages, and the like. As used throughout this document, the terms "e-messaging" and "messaging" will be used interchangeably to include any form of electronic communication using messages, regardless of the particular format or structure of messages, or protocols employed.

The ubiquitous nature of e-messaging coupled with its relatively-low cost (and the ability for anyone to send a message to practically anyone else) has made unsolicited commercial e-messages—commonly referred to as "spam"—one of the most often cited nuisances of the technological age. Remote devices are especially sensitive to spam because of their storage space constraints and bandwidth limitations, plus the difficulty of managing large numbers of messages on a small screen and with limited keys. In response, anti-spam filtering mechanisms are being developed to combat this plague. As forms of e-messaging such as MMS (Multimedia Messaging System) and mobile e-mail become more popular, spam is expected to be an increasing problem.

In the context of this document, "message filtering" means making a determination or decision about messages, such as if a message should be downloaded, retrieved, accessed, displayed, deleted, or otherwise acted on. Typically, message filtering is performed based on the results of a "message analysis," which may be any evaluation of a message to determine, quantify, or qualify some characteristic of the message.

Message filtering takes different forms, but generally speaking it is performed either on a server prior to delivering the messages to a client, or at the client after the messages have been received. Examples of message filtering technologies are many, and include Bayesian filtering and rules-based filtering, such as looking for matches to fixed strings anywhere or in specific fields within the message content or protocol, looking for particular situations in specific fields in the message content or protocol (such as long runs of white space in the message subject, a subject or from address which ends in a number, a subject which starts with "Re" in a malformed way (such as lack of colon or space following "Re"), a subject which starts with "Re" in a message which does not contain an "In-Reply-To" header), looking for anomalies in the protocol, and the like.

A common feature of existing message filter technologies is that the filtering decision is essentially made using criteria and resources local to the device upon which the decision is made. In other words, a server-side filtering mechanism uses resources resident at the server and based on criteria stored at the server. On the other hand, a client-side filtering mechanism uses resources resident on the client and based on criteria stored at the client. This poses a problem for several reasons.

For instance, more sophisticated and effective message filters consume larger amounts of storage space and/or processing power, which are limited commodities on many remote devices. This dilemma suggests that the most effective message filtering can only be done at the server.

In addition, subscribers often have a different spam tolerance depending on what client the subscribers use to retrieve their messages. For instance, a subscriber may be willing to accept a higher likelihood of receiving a spam message (a "higher spam threshold") on his desktop computer that likely has ample storage space, a fast network connection, a full keyboard, and a large screen in exchange for a greater confidence that real messages are not inadvertently blocked. Conversely, that same user may have a much lower spam threshold if retrieving his messages on a remote device.

In addition to the device, the same subscriber may wish to employ different thresholds in different circumstances. For example, a subscriber may want to only see messages that have a very low likelihood of being spam when in a hurry, using a device while roaming, when on a slow dial-up connection, when network access charges are higher, and so forth.

These types of device-specific and/or situational filtering thresholds have been largely ignored by the message filtering industry. An adequate solution to these problems has eluded those skilled in the art, until now.

SUMMARY OF THE INVENTION

The invention is directed to techniques and mechanisms for enabling a server-side component to perform a message analysis on incoming messages, and to pass information about that analysis to a client-side component on a remote device for use by the client-side component in performing client-side message filtering. In one aspect, a messaging system on a server computes a spamicity value (spam score) for incoming messages. The messaging system may filter the incoming messages using that spamicity value, or using any other basis. Conversely, the messaging system may not filter the messages at all. In either case, the spamicity value is communicated to a remote device. In this way, a messaging client at the remote device may determine whether to retrieve the messages, or take some other action, using the calculated spamicity values from the server.

DETAILED DESCRIPTION

What follows is a detailed description of various techniques and mechanisms for addressing unsolicited commercial, junk, or generally unwanted electronic messages. Very generally stated, a message server performs a message analysis using resources and criteria local to the message server. The message server delivers messages to a remote device, possibly only those messages that do not fail the analysis. In addition, the message server provides to the remote device information determined during the server-side message analysis for use by the remote device in its own message analysis and/or message filtering. Those skilled in the art will appreciate that the teachings of this disclosure may be embodied in various implementations that differ significantly from those described here without departing from the spirit and scope of the claimed invention.

Figure 1:
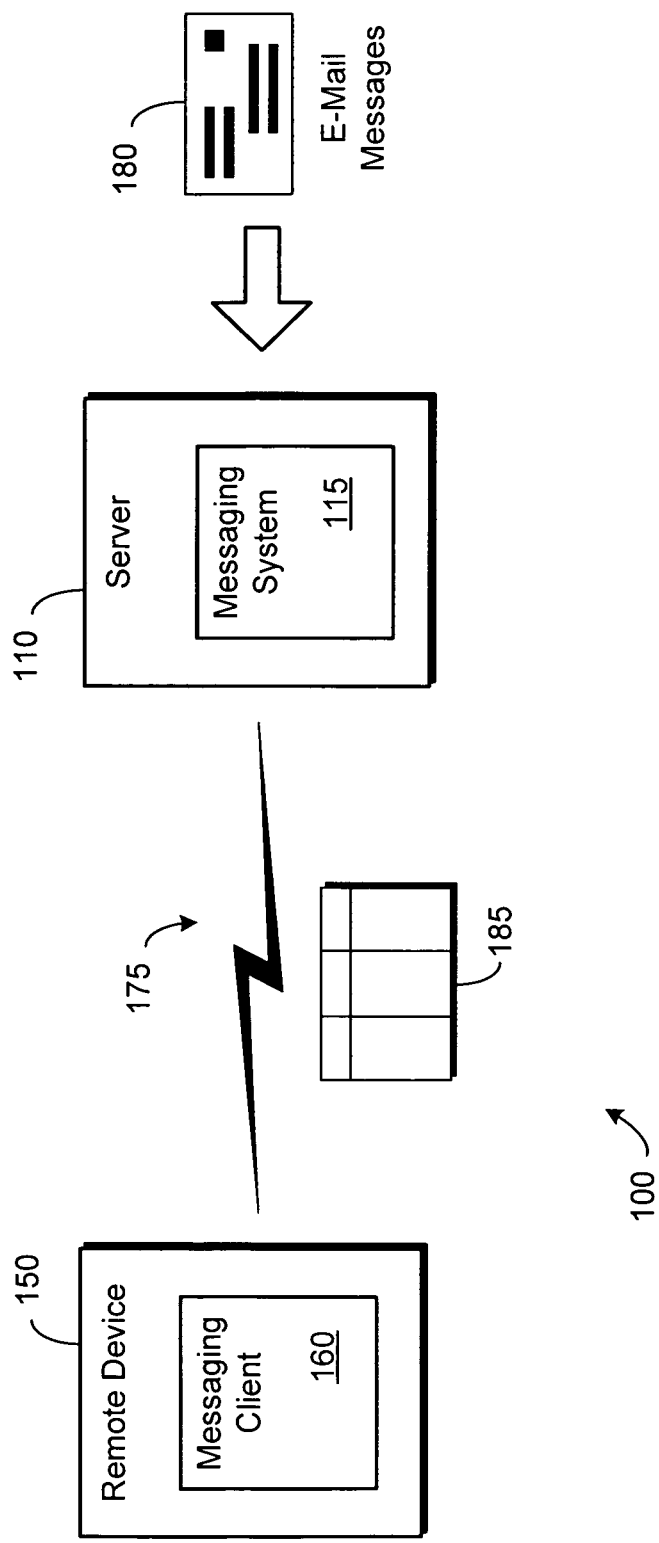
FIG. 1 is a functional block diagram generally illustrating a system for communicating messages from a server to a remote device, and for communicating spamicity information from the server to the remote device.

FIG. 1 is a functional block diagram generally illustrating a system 100 for communicating messages from a server 110 to a remote device 150. The system 100 is only one example of how the inventive techniques and mechanisms may be implemented, and should not be considered exclusive of other implementations. As illustrated, the server 110 includes a messaging system 115 and may be any computing device configured to support the receipt of electronic messages 180 from various origins and directed at subscribers of the messaging system 115. The messaging system 115 includes a message filtering system, described in greater detail in conjunction with FIG. 2. Briefly described, the messaging system 115 analyzes the incoming messages 180 to calculate a spam score for each message. The spam score indicates the likelihood that the message is spam.

The remote device 150 may be any device that presents computing functionality and communicates with the server 110 remotely over a communications link 175. However, devices that benefit most from the techniques and mechanisms described here are typically mobile and either communicate with the server 110 over a communications link 175 of relatively low bandwidth and/or high latency, or are equipped with relatively limited storage space and/or processing power, or both. In one particular implementation, the remote device 150 may be a cellular telephone with integrated messaging capabilities. In this example, the remote device 150 likely has both limited bandwidth and storage space. In another implementation, the remote device 150 could be a personal digital assistant or the like with greater storage and processing capacity but the same low bandwidth and/or high latency communications link. In still another implementation, the remote device 150 could be a stand-alone special purpose device with a greater bandwidth connection but yet may still have storage constraints. In yet another implementation, the remote device 150 may be some mobile or fixed device that has sufficient bandwidth and storage resources, but a user or administrator may simply desire to transfer the message analysis or spam filtering burden from the remote device to the server 110.

The remote device 150 includes a messaging client 160 that is configured to receive or retrieve messages from the server 110. Generally stated, the messaging client 160 can perform a client-side message analysis to help determine whether to retrieve or receive messages from the server 110. The client-side message analysis is performed using local information and resources, as well as information received from the server 110 that describes the character of the messages at the server 110. More specifically, the information received from the server 110 may include a spam score for each message the server 110 makes available to the remote device 150.

As mentioned, the two systems communicate over a communications link 175, which is commonly wireless. Alternatively, the communications link 175 may be a low-bandwidth or high-latency land line. Although only the server 110 and the remote device 150 are illustrated in the figures, it will be appreciated that many other components may be necessary to facilitate the communication link 175 between the server 110 and the remote device 150, such as radio frequency transmitters and receivers, cellular towers, and the like.

The server 110 and the remote device 150 communicate in accordance with a messaging protocol, such as Post Office Protocol (POP), Simple Message Transfer Protocol (SMTP), Internet Message Access Protocol (IMAP), Multimedia Messaging Service (MMS), or the like. Alternatively, the two systems may communicate using an instant messaging protocol, or the like. Similarly, the remote device 150 may initiate requests to learn of new messages from the server 110, or the remote device 150 may be configured to accept asynchronous notifications of new messages from the server 110. In addition, the remote device 150 and the server 110 may be configured such that the remote device 150 requests delivery of specific messages it has been notified about, or all messages, or possibly all messages meeting some criteria, such as being new, below a certain size, and so forth. The remote device 150 and the server 110 may be configured such that messages are asynchronously sent to the remote device 150.

In operation, the server 110 receives messages 180 intended for the user of the remote device 150. The messaging system 115 determines a spam score for each incoming message 180 using resources available to the server, such as a Bayesian analysis engine and data stores, or any other mechanism that computes a likelihood that a message is spam. Messages having a spam score above a certain threshold may be identified as spam and may be deleted, held at the server 110, or otherwise processed. Messages having a spam score below the threshold are made available for download to the remote device 150.

The remote device 150 may connect to the messaging system 115 and initiate a new messaging session. As part of that session, the remote device 150 may issue a request for information about messages stored at the server 110. One example of such a request is a UIDL (Unique IDentifier List) request known in the POP protocol. In response, the messaging system 115 returns a message listing 185 of messages stored at the server. That listing 185 includes a unique identifier for the messages, and may include additional information. The additional information includes the spam score calculated for each message identified in the listing 185. In this way, the messaging client 160 on the remote device 150 may employ the spam score in its determination whether to retrieve or receive the message. Alternatively, the remote device 150 may be notified that new messages are available on the server 110: The spam score(s) could be Included in that notification, or elsewhere.

This feature improves over existing technologies by enabling the remote device 150 to make a determination whether to retrieve particular messages based on a spam score calculated using an analysis mechanism resident at the server. This enables sophisticated spam analyses that would otherwise be unavailable to the remote device 150 due to storage and/or processing limitations. Moreover, this allows a different threshold to be applied at the remote device 150 than might be applied when checking messages using some other mechanism, such as a client computer connected to the server 110 over a high bandwidth or low latency land line, or the like; or in other circumstances, such as the condition of the communications channel, the current preferences of the user, or the like.

Figure 2:
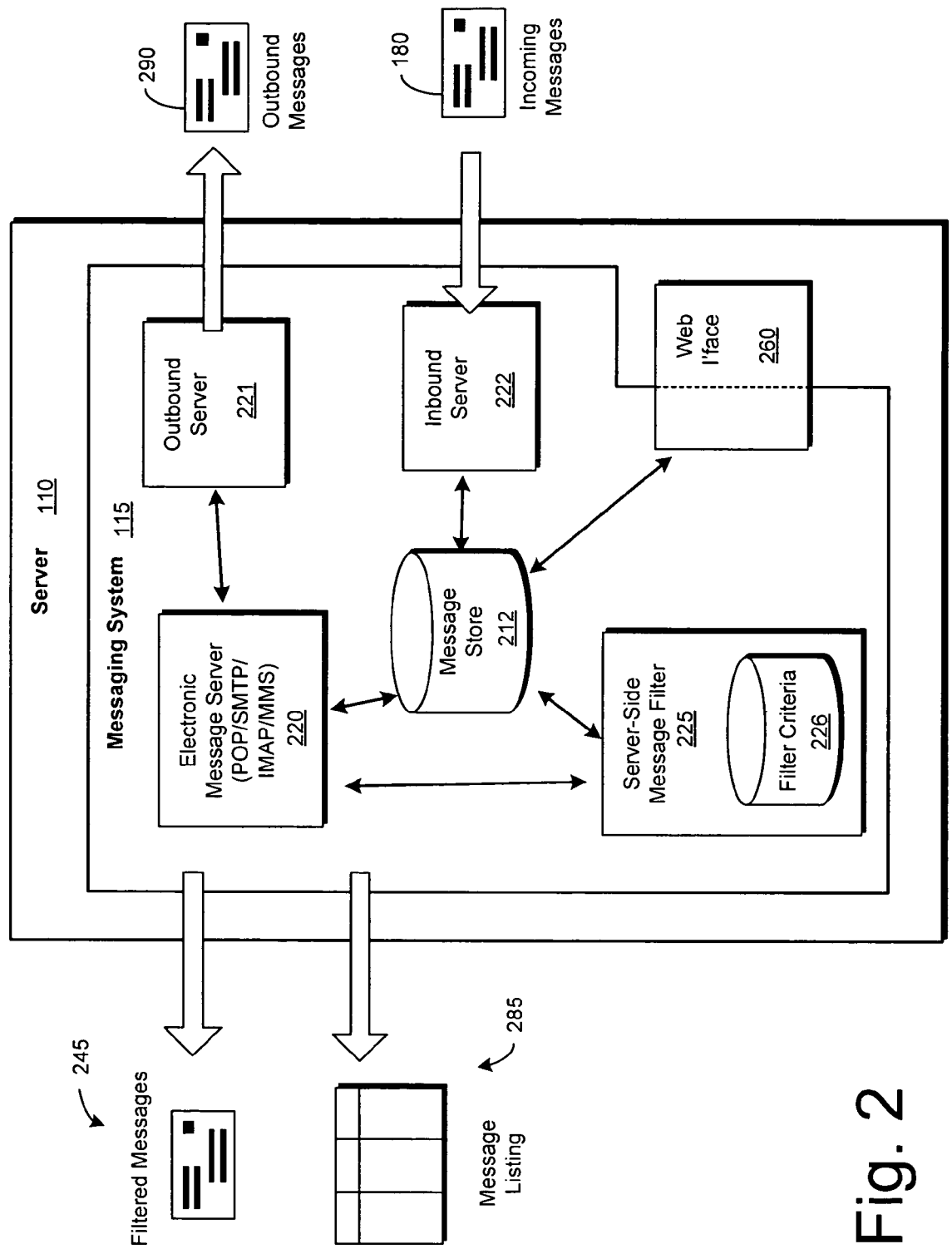
FIG. 2 is a functional block diagram generally illustrating in greater detail the messaging system portion of the server illustrated in FIG. 1.

FIG. 2 is a functional block diagram generally illustrating in greater detail the messaging system 115 of the server 110 illustrated in FIG. 1. In this implementation, the messaging system 115 includes an inbound server 222 to receive incoming messages 180, and an outbound server 221 to transmit outgoing messages 290. The inbound server 222 places incoming messages 180 into a message store 212 where they can be accessed by other components of the messaging system 115. An electronic message server 220, such as a POP/SMTP, IMAP/SMTP, and/or MMS server for example, interacts with a client on a remote device to make incoming messages 180 available to the client and to receive outbound messages 290 from the client for transmission by the outbound server 221. The message server 220 may communicate with or be integrated into other components of the messaging system 115.

The messaging system 115 also contains a server-side message filter 225 that interacts with the message server 220 and the message store 212, and performs a message analysis on incoming messages 180. Any one or more of many different types of message filter analysis may be performed by the message filter 225. For instance, looking for matches to fixed strings anywhere or in specific fields within the message content or protocol, looking for particular situations in specific fields in the message content or protocol (such as long runs of white space in the message subject, a subject or from address which ends in a number, a subject which starts with "Re" in a malformed way (such as lack of colon or space following "Re"), a subject which starts with "Re" in a message which does not contain an "In-Reply-To" header), looking for anomalies in the protocol, and so forth. The only requirement of the server-side message filter 225 is that it be capable of calculating a value that is associated with the likelihood that a message is spam.

Messages having a calculated spam score that violates local filter criteria 226 may be identified as spam and held at the server 110, deleted, returned, or otherwise processed. For instance, messages identified as spam may be specially tagged or moved to a particular location within the message store 212. Depending on the particular messaging technology, the messaging system 115 may simply store all messages at the server 110 until a session is established by the remote device and then make the filtered messages 245 available. Alternatively, the messaging system 115 may include a mechanism for pushing the messages 245 out to the remote device. The message system 115 may also include facilities for notifying the client on the remote device when messages become available.

The message server 220 interacts with a remote device to perform message delivery services. As part of those services, the remote device may request from the message server 220 a list 285 of all, or unread, or new, messages stored at the server 110. In one example, the message server 220 may respond to a UIDL request from a remote device by returning the itemized list 285. Alternatively, the message server 220 may asynchronously deliver the list 285 to the remote device.

Typically, but not necessarily, the message server 220 identifies in the list 285 those messages stored in the message store 212 that have not failed the server-side filter criteria 226. Each entry in the list 285 includes at least an identifier for a message, and the spam score for that message as calculated above. The entry may also include other information about or attributes of the message, such as message size, presence of attachments or contained media, header information, subject information, the sender, and the like. In this way, the list 285 provides information to the remote device which may not otherwise be available. For example, the server-side message filter 225 may employ sophisticated and complex technology that consumes large amounts of resources on the server 110. This type of filter may achieve highly reliable results, but be too taxing for the resources of the typical remote device. Thus, the system described here allows for those highly reliable results to be calculated using the greater resources of the server 110, but yet be made available to the remote device for input into its decision regarding handling the messages (such as whether to download them or not). Moreover, the server-side filter criteria 226 may set some thresholds at a spam level that is acceptable for many or most circumstances, but yet are not particularly desirable criteria under other circumstances, such as when the remote device is connecting to the server 110 over a high-latency communication link.

The server 110 may also include a Web interface 260 that interacts with the messaging system 115 and external systems over a wide area network connection 265 to make functionality on the server 110 publicly accessible. The Web interface 260 allows users to access their messages stored in the message store 212 while connected over the Internet or other wide area networking technology. Using the Web interface 260, the user can connect to the messaging system 115 and examine any messages that were marked as spam and not downloaded to the remote device.

Figure 3:
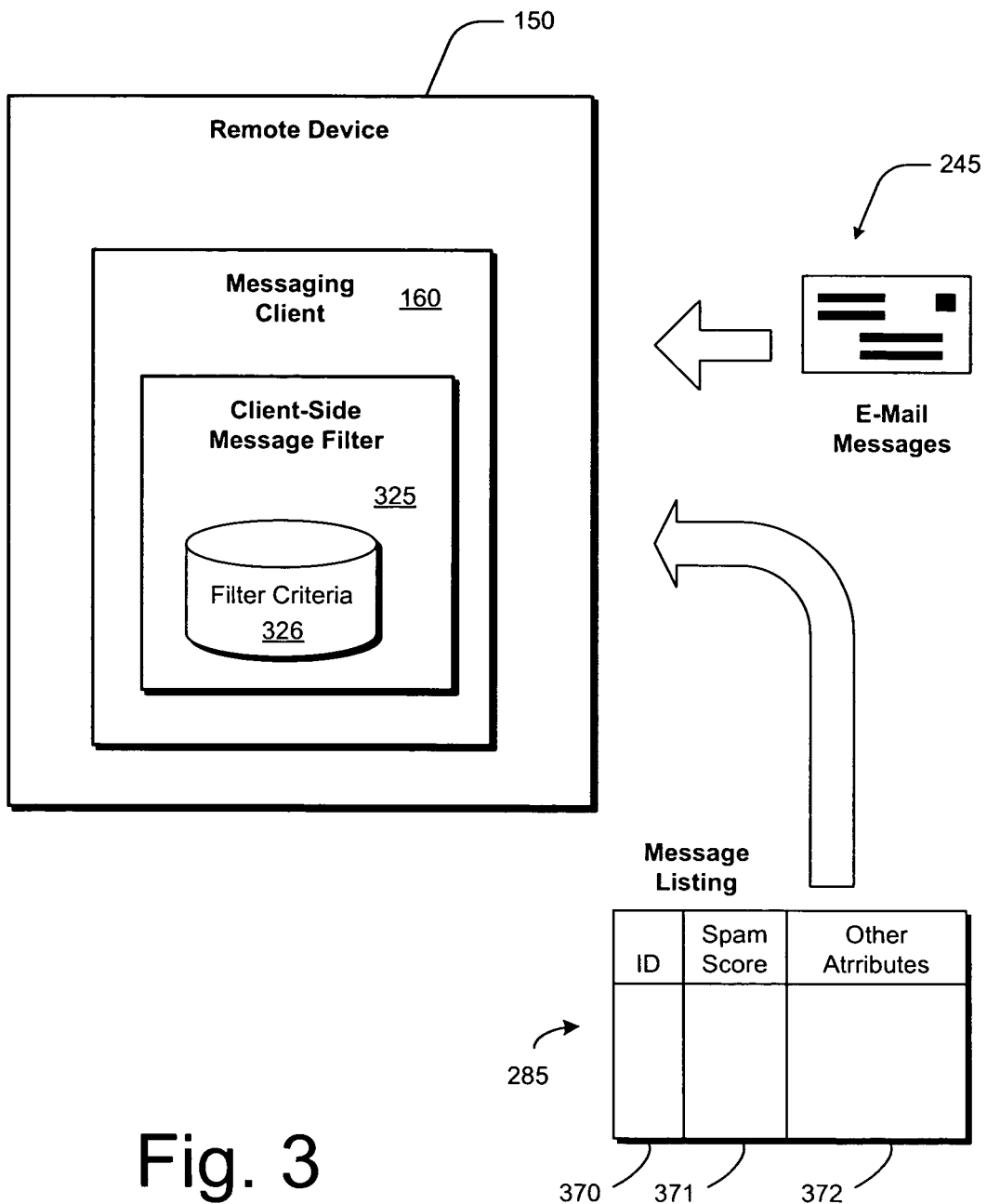
FIG. 3 is a functional block diagram generally illustrating in greater detail the remote device portion of the system illustrated in FIG. 1.

FIG. 3 is a functional block diagram generally illustrating in greater detail the remote device 150 shown in FIG. 1. The remote device 150 may include several applications, including a messaging client 160 which contains a client-side message filter 325. The remote device 150 may also include browsing software (not shown). Although the messaging client 160 could be configured to use any type of messaging protocol, in this particular implementation the messaging client 160 is configured with conventional e-mail client functions, such as receiving and composing e-mail messages, and the like. The messaging client 160 could equally be configured to communicate messages through any other messaging system, such as instant messaging or the like.

The messaging client 160 is configured to interact with the message server 220 (FIG. 2) to receive messages 245 from the server. The message filter 325 is configured to make a determination whether to retrieve a message from the server, based on filter criteria 326 local to the remote device 150. The likelihood that a message is spam may be the sole criteria, or a factor in the decision. The message filter 325 may include any number of mechanisms to perform the message analysis, such as a pure rules-based analysis or a more complex computational analysis. This particular message filter 325 is also configured to evaluate whether to download or receive an incoming message 245 based on an evaluation of a spam score for the message, perhaps using the local filter criteria 326. The spam score for the message is identified in a list 285 received from the server either by request or asynchronously or in a notification for the message. In one example, the list 285 may be provided to the messaging client 160 in response to a request, such as a UIDL request. In another example, the notification may be issued to the messaging client 160 when new messages arrive at the server 110. In still another example, the spam score could be included with the message itself.

The list 285 includes a unique identifier 370 for each message, and a spam score 371 for the message. The list may also include other attributes 372 and information. The particular form of the list 285 is not important, and other messaging protocols may employ various techniques for transmitting attribute information about messages to the remote device 150. It is envisioned that the spam score is added to that attribute information in whatever form it may take.

The local filter criteria 326 allows the client-side filter 325 to be tailored with a spam threshold that may be different than that employed on the server-side message filter 225 (FIG. 2). This results in the ability to perform two levels of message filtering using the same spamicity computation. One advantage of this ability is that the remote device 150 may be configured to exclude messages having a lower spamicity threshold than might be applied at the server. This may result in more false positives, but reduce the amount of message traffic between the remote device 150 and the server, reduce the number of messages the user needs to examine on the remote device, etc. In some specific implementations, the user may modify the local filter criteria 326 depending on factors such as if the user is roaming, if the signal strength is good, if the user is in a hurry, and so on. Thus, the user may be aware of messages in some cases, using a higher spam threshold, than in other cases, using a lower spam threshold.

Receiving the spam score as a notification from the server makes available more complex spam analyses than may be possible with the resources locally available to the client-side messaging filter 325. However, even if local resources were sufficient for complex spam analyses, the performance of that analysis at the server rather than at the remote device 150 frees those resources for other tasks.

Figure 4:
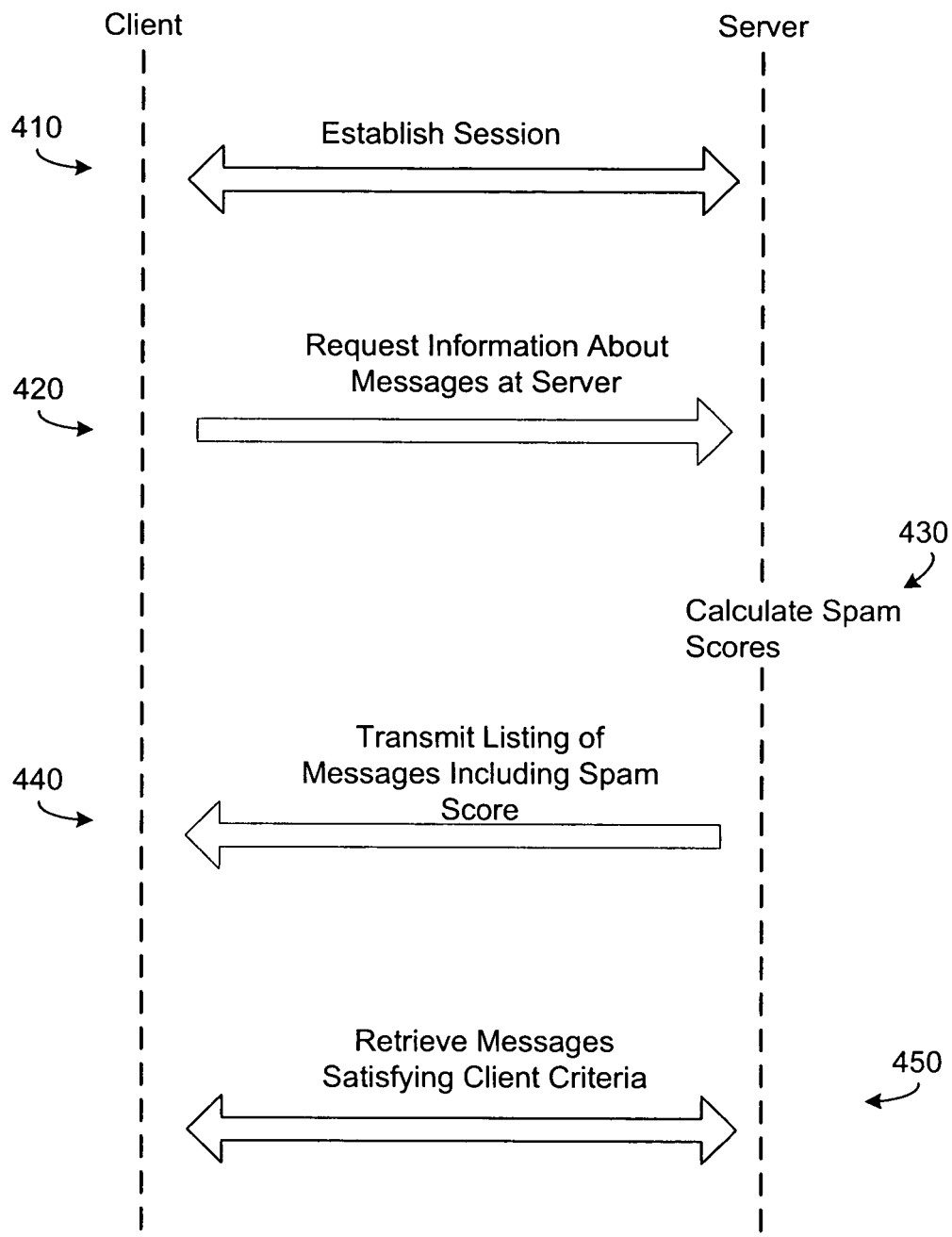
FIG. 4 is an operational flow diagram generally illustrating the flow of information between a server and a remote device to communicate spamicity information about messages.

FIG. 4 is an operational flow diagram illustrating generally the flow of messages between the remote device (client) and the server. To begin, at step 410, the client and server initiate a session so that electronic messages may be made available to the client. The session may be an actual negotiated session between the client and the server, or it may be simply the occurrence of a communication from one device to the other, such as an MMS, WAP or other PUSH, or other message transmitted to the client.

At step 420, the client issues to the server a request for information about messages stored at the server. The request is for attribute information for the messages rather than the messages themselves. Although described here as a request issued by the client, it should be appreciated that the request may be implicit in cases where the server transmits message information to the client asynchronously. In other words, the server may asynchronously transmit notification information to the client without necessarily a request from the client.

At step 430, the server calculates spam scores for the messages stored at the server. The spam score may be calculated using any one or more of many message analysis techniques. It should also be noted that the spam score may be calculated at any point, and it is not necessary that the spam scores be calculated after the client request is received (step 420) despite the order of steps illustrated in FIG. 4. In other words, the spam scores may be calculated for each message as they arrive, or as a group based on some event, such as the initiation of a client-session, or based on some periodicity, or at any other arbitrary time. The order of the steps illustrated in FIG. 4 is not mandatory.

At step 440, the server transmits to the client a listing of messages including the spam scores. In one example, the server may transmit the listing to the client as a UIDL listing. The server may transmit the listing in other ways as well, such as asynchronously in the case where the client request is implicit. In other cases, the listing may be transmitted as a notification that a new message has or messages have arrived at the server. In still other cases, the spam score information may be included with the messages themselves, and are thus available when the client retrieves the messages.

At step 450, the client may retrieve from the server messages that satisfy criteria stored at the client. The spam scores in the listing may be used to determine whether the messages satisfy the criteria. Those messages that do may be retrieved from the server.

To more clearly illustrate the preceding concepts, what follows is a pseudo-code representation of a sample exchange between the remote device and the server to communicate spamicity information about messages. The pseudo-code is loosely based on an exchange between a client and a POP e-mail server. POP is chosen only for illustrative purposes because of the simplicity of the protocol. In this example, a remote device retrieves identification information about messages at the server, and the identification information includes spamicity information for the messages. The following table includes a simplified sample exchange that may occur between the client (C:) and the server (S:) to accomplish that operation:

| Dev. | Commands | Description |
| --- | --- | --- |
| C:/S: | {session initiation} | A connection is established between the client and the server. For example, a TCP connection is opened and a protocol banner is sent from the server to the client. |
| C:/S: | {authentication} | Some operations and exchanges to authenticate the remote device with the server and open a session. |
| S: | (List number of messages) | The server returns to the remote device a listing of the number of new messages. |
| C: | UIDL | The remote device requests unique identifiers for each message. |
| S: | 1 XYZ 1 [SPAM SCORE]<br>2 XYZ 2 [SPAM SCORE]<br>3 XYZ 3 [SPAM SCORE] | The server returns a list including a unique identifier and spam score for each message, and may also include additional information about each message. |
| C: | RETR 2 | The remote device issues an instruction to retrieve message number 2. |
| C: | DELE 1 | The remote device issues an instruction to delete message number 1. |
| S: | (Send 2) | The server transmits message number 2 to the remote device. |
| S: | OK message 1 deleted | The server acknowledges that message number 1 has been deleted. |

In this example, the spam scores for each message are transmitted in response to a UIDL request issued by the client. The client, after performing a message analysis on the messages using the spam scores, retrieves message number 2, and issues an instruction to delete message number 1. Note that in this example the client does not retrieve message number 3 because the client determines, using the spam score from the server, that it does not satisfy the client-side criteria.

This example illustrates only one of many different scenarios where a remote device can perform client-side message filtering using the results of a server-side message analysis.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

I claim:

1. A method for communicating information about content of an electronic message to a remote device, the method comprising:
   receiving at a server the electronic message;
   calculating at the server a spam score for the electronic message, the spam score being related to a likelihood that the electronic message comprises spam; and
   communicating a message list to the remote device prior to communicating the electronic message to the remote device, wherein the message list includes information about the electronic message including the spam score.

2. The method of claim 1, wherein the electronic message comprises an e-mail message.

3. The method of claim 1, wherein the electronic message comprises an instant message.

4. The method of claim 1, wherein communicating the message list to the remote device comprises issuing a notification of the spam score to the remote device.

5. The method of claim 4, wherein the notification is issued to the remote device asynchronously.

6. The method of claim 4, wherein the notification is issued in response to a request from the remote device for information about messages stored at the server.

7. The method of claim 5, wherein the notification is issued in response to the receipt of the electronic message at the server.

8. A method for communicating information about content of an electronic message to a remote device, comprising:
receiving at the remote device from a server a notification of the electronic message prior to communicating the electronic message to the remote device, the notification including a spam score that identifies a likelihood that the electronic message comprises spam.

9. The method of claim 8, wherein the notification comprises a listing of messages stored at the server, and the notification further comprises a unique identifier for the messages stored at the server.

10. The method of claim 9, wherein the notification is sent to the remote device by the server in response to a request for the unique identifiers.

11. The method of claim 8, wherein the notification is sent to the remote device by the server asynchronously.

12. The method of claim 11, wherein the notification is issued in response to an arrival of the electronic message at the server.

13. The method of claim 8, wherein the spam score is calculated at the server using resources local to the server.

14. The method of claim 13, wherein the resources comprise a message analysis mechanism.

15. The method recited in claim 8, further comprising performing a message filtering operation using the spam score.

16. The method of claim 8, further comprising performing a further message analysis using the spam score.

17. A remote device, comprising:
a messaging client configured to receive from a server a notification of an electronic message prior to communicating the electronic message to the remote device, the notification including a spam score identifying a likelihood that the electronic message comprises spam, the spam score having been calculated using resources local to the server.

18. The remote device of claim 17, wherein the messaging client is further configured to perform message filtering on the electronic message using the spam score.

19. The remote device of claim 18, wherein the message filtering further comprises a determination whether to retrieve the electronic message from the server.

20. The remote device of claim 17, wherein the messaging client is further configured to perform further message analysis using the spam score.

21. A server comprising:
a messaging system configured to receive an electronic message, to perform a message analysis on the electronic message to achieve a spam score, and to communicate the spam score to a remote device prior to communicating the electronic message to the remote device.

22. The server of claim 21, wherein the spam score indicates a likelihood that the electronic message comprises spam.

23. The server of claim 22, wherein the spam score is communicated to the remote device asynchronously.

24. The server of claim 22, wherein the spam score is communicated to the remote device in response to a request from the remote device for a listing of messages at the server.

25. An apparatus for communicating information about content of an electronic message to a remote device, the apparatus comprising:
means for receiving at a server the electronic message;
means for determining at the server a spam score for the electronic message, the spam score being related to a likelihood that the electronic message comprises spam; and
means for communicating a message list to the remote device prior to communicating the electronic message to the remote device, wherein the message list includes information about the electronic message including the spam score.

26. The apparatus of claim 25, wherein the message list is communicated to the remote device by issuing a notification of the spam score to the remote device.

27. The apparatus of claim 26, wherein the notification is issued to the remote device asynchronously.

28. A non-transitory computer-readable medium comprising instructions for communicating information about content of an electronic message to a remote device which, when executed by a machine, causes the machine to perform operations, the instructions comprising:
at least one instruction for receiving at a server the electronic message;
at least one instruction for determining at the server a spam score for the electronic message, the spam score being related to a likelihood that the electronic message comprises spam; and
at least one instruction for communicating a message list to the remote device prior to communicating the electronic message to the remote device, wherein the message list includes information about the electronic message including the spam score.

29. A non-transitory computer-readable medium of claim 28, wherein the message list is communicated to the remote device by issuing a notification of the spam score to the remote device.

30. A non-transitory computer-readable medium of claim 29, wherein the notification is issued to the remote device asynchronously.

31. An apparatus for communicating information about content of an electronic message to a remote device, comprising:
means for receiving at the remote device from a server a notification of the electronic message prior to communicating the electronic message to the remote device, the notification including a spam score that identifies a likelihood that the electronic message comprises spam.

32. The apparatus of claim 31, wherein the notification comprises a listing of messages stored at the server, and the notification further comprises a unique identifier for the messages stored at the server.

33. A non-transitory computer-readable medium comprising instructions for communicating information about content of an electronic message to a remote device which, when executed by a machined, causes the machine to perform operations, the instructions comprising:

at least one instruction for receiving at the remote device from a server a notification of the electronic message prior to communicating the electronic message to the remote device, the notification including a spam score that identifies a likelihood that the electronic message comprises spam.

34. A non-transitory computer-readable medium of claim 33, wherein the notification comprises a listing of messages stored at the server, and the notification further comprises a unique identifier for the messages stored at the server.

\* \* \* \* \*